United States Patent
Zhang et al.

(10) Patent No.: US 9,888,236 B2
(45) Date of Patent: Feb. 6, 2018

(54) LIQUID CRYSTAL PANEL AND THE DETECTION METHOD ON IMAGE STICKING OF THE LIQUID CRYSTAL PANEL

(71) Applicant: SHENZHEN CHINA STAR OPTOELECTRONICS TECHNOLOGY CO., LTD., Shenzhen, Guangdong (CN)

(72) Inventors: Yueyan Zhang, Guangdong (CN); Yi Feng Yang, Guangdong (CN); Chien-Pang Lee, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/440,103

(22) PCT Filed: Dec. 26, 2013

(86) PCT No.: PCT/CN2013/090607
§ 371 (c)(1),
(2) Date: May 1, 2015

(87) PCT Pub. No.: WO2015/089875
PCT Pub. Date: Jun. 25, 2015

(65) Prior Publication Data
US 2016/0286211 A1    Sep. 29, 2016

(30) Foreign Application Priority Data

Dec. 20, 2013   (CN) .......................... 2013 1 0713572

(51) Int. Cl.
*G01R 31/26*   (2014.01)
*H04N 17/02*   (2006.01)
*G02F 1/13*   (2006.01)

(52) U.S. Cl.
CPC .......... *H04N 17/02* (2013.01); *G02F 1/1309* (2013.01); *G02F 2203/69* (2013.01)

(58) Field of Classification Search
CPC ............. H04N 17/02; G09G 3/36; G09G 5/10
See application file for complete search history.

(56) References Cited

U.S. PATENT DOCUMENTS

2009/0051707 A1*  2/2009  Hirata ................. G02F 1/13471
                                                            345/690
2009/0085858 A1*  4/2009  Hsu ...................... G09G 3/3688
                                                            345/100

(Continued)

FOREIGN PATENT DOCUMENTS

CN           1844975 A      10/2006
CN         101435921 A       5/2009

(Continued)

OTHER PUBLICATIONS

Fei Xie, The International Searching Authority written comments, dated Oct. 2014, CN.

*Primary Examiner* — Tung X Nguyen

(57) ABSTRACT

A liquid crystal panel comprises an end product area and a test area, wherein a RGB test block, a blank block and three monochrome blocks are provided in the test area, the monochrome blocks comprises a red test block, a green test block and a blue test block, the RGB test block is compounded with a red light resistance, a green light resistance and a blue light resistance, the electric resistance and the metal ionic concentration of the RGB test block is equal to that of the end product area, the electric resistance and the metal ionic concentration can be determine whether the related target (Continued)

parameters of the liquid crystal panel on the end product area will reach the standard or not. Detection method on image sticking of the liquid crystal panel, the detecting efficiency will be obviously improved and the defect rate will be reduced.

8 Claims, 1 Drawing Sheet

(56) References Cited

U.S. PATENT DOCUMENTS

2009/0147186 A1* 6/2009 Nakai .................. G02F 1/13471
349/74
2011/0261091 A1* 10/2011 Nose .................... G09G 3/3611
345/690

FOREIGN PATENT DOCUMENTS

| CN | 101655614 A | 2/2010 |
| CN | 102944945 A | 2/2013 |
| JP | H0527111 A | 2/1993 |
| JP | 2004-4740 A | 1/2004 |
| TW | 502107 | 9/2002 |

\* cited by examiner

LIQUID CRYSTAL PANEL AND THE DETECTION METHOD ON IMAGE STICKING OF THE LIQUID CRYSTAL PANEL

FIELD OF THE INVENTION

The invention relates to a liquid crystal panel and a detection method, more particularly relates to a liquid crystal panel and the detection method on image sticking of the liquid crystal panel.

BACKGROUND OF THE INVENTION

Image sticking (IS) is a main detection project in the open cell process of the liquid crystal panel. There are many effect factors on the image sticking, such as, bad in the design of the capacitance on the TFT actuator, the metal is sticking on the manufacture process, the electric resistance of the liquid crystal material is not reach the standard. In the current detection methods, one of detection method is following: firstly, saving 168 hours the liquid crystal panel in a high-temperature and high-humidity condition; secondly, detecting the appearance effect for seven days, so the detecting time is too longer that the quality of the liquid crystal panel cannot be achieved on time. Another detection method is following: the liquid crystal material and the metal can be determined to be in the standard or not with the detection of the electrical resistance, if the liquid crystal material is not in the standard, that the parasitic capacitance will be produced and then the rotation of the liquid crystal molecule will even be influenced.

After the reliability testing, the liquid crystal panel shall be make an image sticking detection for long time. If the image sticking is out of the standard, the reason of the image sticking shall be analyzed and traced by disassembling the liquid crystal panel or stratifying with a design experiment, so that it will bring wasting on capacity and material.

SUMMARY OF THE INVENTION

The main purpose of the present invention is to provided a liquid crystal panel and a detection method for rapidly detecting the image sticking.

The present invention is provided for a liquid crystal panel which dividing an end product area and a test area, wherein a RGB test block and a blank block are provided in the test area, the RGB test block is compounded with a red light resistance, a green light resistance and a blue light resistance, the electric resistance and the metal ionic concentration of the RGB test block is equal to that of the liquid crystal panel on the end product area, the electric resistance and the metal ionic concentration of the RGB test block can be detected to determine whether the related target parameters of the liquid crystal panel on the end product area will reach the standard or not.

Preferably, the test area is located at any side of the end product area. The test block further comprises three monochrome blocks in the test area which are a red test block, a green test block and a blue test block. The RGB test block, the blank block, the red test block, the green test block and the blue test block are align on a line. The length of each test block is separated larger than 5 mm, and the width of each test block is separated larger than 3 mm.

The present invention is also provided for a detection method on image sticking of the liquid crystal panel, which comprising the following steps:

Step 1) dividing a test area on the liquid crystal panel, which is comprising the RGB test block and the blank block;

Step 2) detecting the related target parameters of the RGB test block, if the target parameters are in the preset scope, then the detection result shows there is no appearing image sticking on the liquid crystal panel; if the target parameters are exceeding out of the preset scope, then the detection result shows there is appearing image sticking on the liquid crystal panel; and then go on step 3);

Step 3) detecting the target parameters of the blank block, if the target parameters are exceeding out of the preset scope, then the detection result shows the material of the present liquid crystal base is over proof.

Preferably, the target parameters are the electric resistance and the metal ionic concentration of the RGB test block.

Preferably, the test block is further comprising three monochrome blocks which separately are the red test block, the green test block and the blue test block. It can be distinguished that the image sticking produced from which light resistance with the monochrome detection. Detecting the target parameters from the red test block, the green test block and the blue test block in proper order, if the target parameter of any test block is exceeding out of the preset scope, then the detection result shows the image sticking on the liquid crystal panel is exceeding out of the preset scope, and the name of the detected test block is outputted in the detection result.

Preferably, in step 4) saving the detected electric resistance and the metal ionic concentration of each test block, so as to trace the effect factors on the image sticking and the quality of the liquid crystal panel.

Compared to the prior art, the liquid crystal panel and the detection method on image sticking of the present invention, the electrical resistance and the metal ionic concentration of the small test block sample can be detected in advanced for determining the image sticking on the end product area of the liquid crystal panel whether exceeding out of the preset scope or not, so the time for detecting the image sticking will be great shorten. The detection result of the image sticking can be achieved seven days in advance, and then the detecting efficiency will be obviously improved, and the defect rate will be reduced, and the yield will be raise. Therefore, the product quality of the liquid crystal panel will be better to present more preferred displaying effect. With the detecting on the monochrome light resistance, the effect factors on the image sticking will be rapidly achieved and the waste on capacity and material from stratifying will be reduced. As a result, the related parameter and the quality of the liquid crystal on the same panel can be rapidly confirmed. The defective goods can be prohibited delivering rapidly.

DETAILED DESCRIPTION OF THE PREFERRED EMBODIMENTS

For improving the efficiency on detecting the liquid crystal panel, the present invention is provided for an improved liquid crystal panel structure for rapidly detecting the image sticking on the liquid crystal panel. The present invention is also provided for a detection method on image sticking. Firstly, the liquid crystal panel is opening cell, and then taking a sample panel to make multiple detect. With sample detecting, the detecting time will be great shorten and the detecting efficiency also will be obviously improved, so that the product quality will be improved and defective goods on overproof image sticking can be found out and avoided delivering not only in sampling inspection process.

The present invention is provided for a liquid crystal panel comprising an end product area 1 and a test area 2 on the manufacture process. The test area 2 is mounted beside the end product area 2. There are several test blocks divided on the test area 2. The liquid crystal panel on the end product area can be detected to determine whether the test block is qualified or not with the separate detection.

Figure 1:
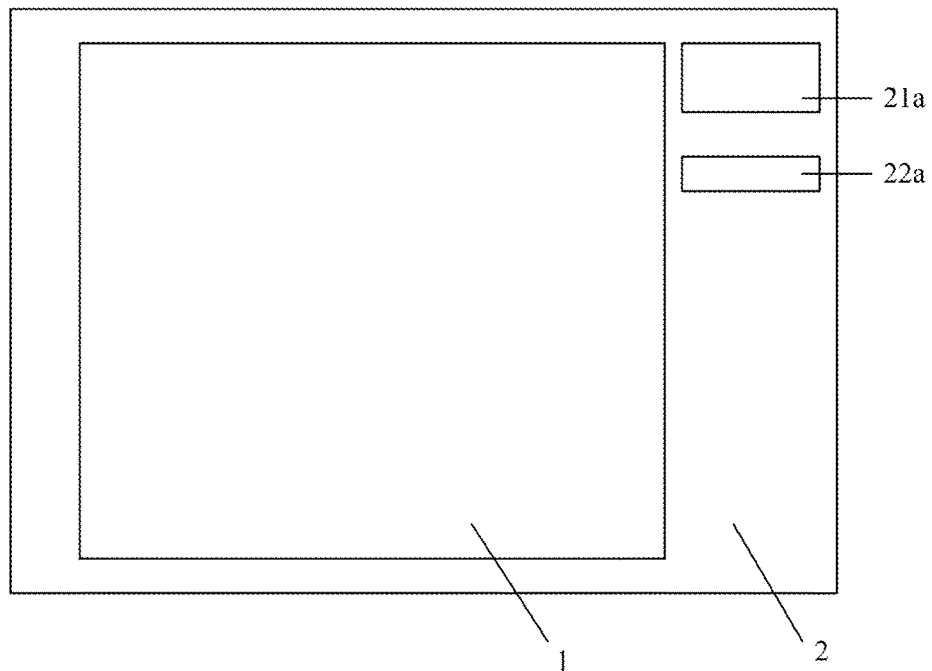
FIG. 1 is a perspective view of the liquid crystal panel of the first embodiment according to the present invention.

Referring to FIG. 1, in the first embodiment, a RGB test block 21*a* and a blank block 22*a* are provided in the test area 2, the RGB test block 21*a* is compounded with a red light resistance, a green light resistance and a blue light resistance. The electric resistance, the metal ionic concentration and the pixel of the RGB test block 21*a* is equal to that of the liquid crystal panel on the end product area 1, the electric resistance and the metal ionic concentration of the RGB test block 21*a* can be detected to determine whether the related target parameters of the liquid crystal panel on the end product area will reach the standard or not. The test block 2 is located at the right side of the end product area 1, which can be separated from the end product area 1 by cutting for separately detecting. The length of the RGB test block 21*a* and the blank block 22*a* is separated larger than 5 mm, and the width of each test block is separated larger than 3 mm.

The present invention is also provided for a detection method on image sticking of the liquid crystal panel, which comprising the following steps:

Step 1) dividing a test area on the liquid crystal panel, which is comprising the RGB test block 21*a* and the blank block 22*a*;

Step 2) detecting the related target parameters of the RGB test block, if the target parameters are in the preset scope, then the detection result shows there is no appearing image sticking on the liquid crystal panel; if the target parameters are exceeding out of the preset scope, then the detection result shows there is appearing image sticking on the liquid crystal panel; and then go on step 3);

Step 3) detecting the target parameters of the blank block, if the target parameters are exceeding out of the preset scope, then the detection result shows the material of the present liquid crystal base is over proof.

In step 1), the test area is located at any side of the end product area, the test area can be cut to separate from the end product area. The RGB test block 21*a* and the blank block 22*a* are provided in the test area 2, which are synchronous mould with the end product area of the liquid crystal panel. There is no any light resistance coating on the blank block 22*a*, so the intrinsic characteristic of the liquid crystal material can be presented on the blank block 22*a*. The RGB test block is coating with different color light resistances layer by layer, which are compound of the red light resistance, the green light resistance and the blue light resistance. The RGB test block can be synchronously shaped with the end product area on the liquid crystal panel. So they are carrying the same characteristic.

In step 2), the target parameters are the electric resistance and the metal ionic concentration of the RGB test block and/or the blank block. After separating the test area and the end product area, and then detecting the electric resistance and the metal ionic concentration of the RGB test block 21*a*, if the electric resistance and the metal ionic concentration of RGB test block is exceeding out of the preset scope, then the detection result shows the image sticking on the liquid crystal panel is exceeding out of the preset scope, and the name of the detected test block is outputted in the detection result. That is to say, in the detection result showing: the electric resistance and the metal ionic concentration of RGB test block is exceeding out of the preset scope, so the image sticking on the RGB test block is over proof. As a result, the detection result is showing that the image sticking on the end product of the liquid crystal panel is over proof.

And next, detecting the electric resistance and the metal ionic concentration of the blank block, if the target parameter is exceeding out of the preset scope, then the detection result is showing that the metal ionic concentration of the liquid crystal material is exceeding out of the standard.

The electrical resistance and the metal ionic concentration of the small test block sample can be detected in advanced for detecting the image sticking on the end product area of the liquid crystal panel and determining the image sticking whether exceeding out of the preset scope or not. Before the liquid crystal panel molding, the electric resistance and the metal ionic concentration can be detected to determine whether the image sticking on the liquid crystal panel is over proof or not after opening cell. With the independent detecting to the blank block, that the metal ionic concentration of the liquid crystal material can be detected and analyzed whether it is over proof or not. Therefore, the image sticking parameter of the liquid crystal panel on the end product area can be rapidly detected and determined whether it reaches or exceeds the standard, so the detection time will be great shorten and the yield also will be improved. The substandard goods and the factor on the image sticking will be discharged as soon as possible.

Figure 2:
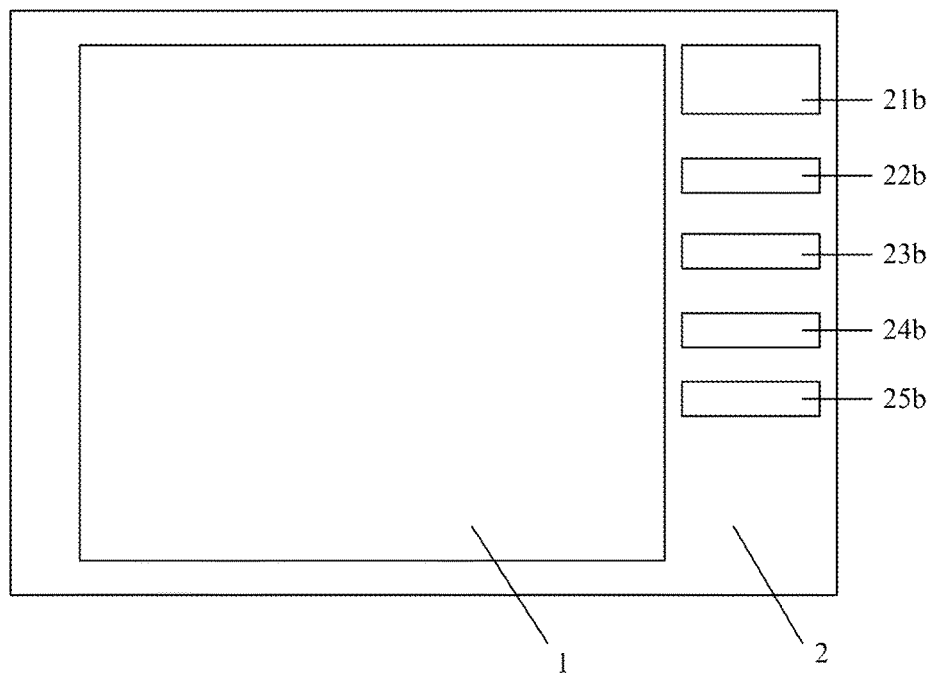
FIG. 2 is a perspective view of the liquid crystal panel of the second embodiment according to the present invention.

Referring to FIG. 2, in the second embodiment, a RGB test block 21*b*, a blank block 22*b* and three monochrome blocks are provided in the test area 2, the monochrome blocks comprises a red test block 23*b*, a green test block 24*b* and a blue test block 25*b*. The test area 2 is located at any side of the end product area 1. The RGB test block 21*b*, the blank block 22*b*, the red test block 23*b*, the green test block 24*b* and the blue test block 25*b* are align on a line. The RGB test block 23*b* is compounded with a red light resistance, a green light resistance and a blue light resistance. The test block 2 is located at the right side of the end product area 1, which can be separated from the end product area 1 by cutting for separately detecting. The length of each test block is separated larger than 5 mm, and the width of each test block is separated larger than 3 mm.

The present invention is also provided for a detection method on image sticking of the liquid crystal panel, which comprising the following steps:

Step 1) dividing a test area on the liquid crystal panel, which is comprising the RGB test block 21*b*, the blank block 22*b*, the monochrome blocks, wherein the monochrome blocks comprise a red test block 23*b*, a green test block 24*b* and a blue test block 25*b*;

Step 2) detecting the electric resistance and the metal ionic concentration of the RGB test block, the blank block, the monochrome blocks, if the target parameters are in the preset scope, then the detection result shows there is no appearing image sticking on the liquid crystal panel; if the target parameters are exceeding out of the preset scope, then the detection result shows there is appearing image sticking on the liquid crystal panel; and then go on step 3);

Step 3) detecting the target parameters of the blank block, if the target parameters are exceeding out of the preset scope, then the detection result shows the material of the present liquid crystal base is over proof.

In step 1), the test area is located at any side of the end product area, the test area can be cut to separate from the end product area. The RGB test block 21*a* and the blank block 22*a* are provided in the test area 2, which are synchronous mould with the end product area of the liquid crystal panel. There is no any light resistance coating on the blank block 22*a*, so the blank block 22*a* can presented the intrinsic characteristic of the liquid crystal material. The RGB test block 21*a* is coating with different color light resistances layer by layer, which are compound of the red light resistance, the green light resistance and the blue light resistance. The RGB test block can be synchronously shaped with the end product area on the liquid crystal panel. So they are carrying the same characteristic. The three monochrome blocks are separated effect on the image sticking result from the red light resistance, the green light resistance and the blue light resistance.

In step 2), detecting the target parameters of the red test block, the green test block and the blue test block in proper order, if the target parameter of any test block is exceeding out of the preset scope, then the detection result shows the image sticking on the liquid crystal panel is exceeding out of the preset scope, and the name of the detected test block is outputted in the detection result.

In step 2), the target parameters are the electric resistance and the metal ionic concentration of the RGB test block and/or the blank block. Further comprising the following steps:

step 21) Firstly, separating the test area and the end product area by cutting, and then detecting the electrical resistance and the metal ionic concentration of the RGB test block 21*a*. If the electrical resistance and the metal ionic concentration of RGB test block 21*a* is exceeding out of the preset scope, then the detection result shows the image sticking on the liquid crystal panel is exceeding out of the preset scope, and the name of the detected test block is outputted in the detection result. That is to say, in the detection result showing: the electric resistance and the metal ionic concentration of RGB test block is exceeding out of the preset scope, so the image sticking on the RGB test block is over proof. As a result, the detection result is showing that the image sticking on the end product of the liquid crystal panel is over proof.

Step 22) detecting the target parameters of the red test block, the green test block and the blue test block in proper order, if the target parameter of any test block is exceeding out of the preset scope, then the detection result shows the image sticking on the liquid crystal panel is exceeding out of the preset scope, and the name of the detected test block and the effect factor on image sticking is outputted in the detection result. If the metal ionic concentration in the red test block is over proof, then that of the metal ionic concentration will be correspondingly reduced according to the detection result. By separated detecting the test block of each monochrome blocks, the effect factor on the image sticking can be detected and distinguished result from which test block, and adjusting the degree of the correspondent light resistance according to the detection result, so as to more accurately adjust the degree of the light resistance on the liquid crystal panel, and rapidly removing the effect factors and improving the product quality.

In another preference embodiment, in step 4) saving the detected electric resistance and the metal ionic concentration of each test block, and building files for saving the test ID of the liquid crystal panel, so as to trace the effect factors on the image sticking and the quality of the liquid crystal panel.

The electrical resistance and the metal ionic concentration of the small test block sample can be detected in advanced for detecting the image sticking on the end product area of the liquid crystal panel and determining the image sticking whether exceeding out of the preset scope or not, so the time for detecting the image sticking will be great shorten. and then the detecting efficiency will be obviously improved, and the defect rate will be reduced, and the yield will be raise. Therefore, the product quality of the liquid crystal panel will be better to present more preferred displaying effect.

What is claimed is:

1. A detection method on image sticking of the liquid crystal panel, which comprising the following steps:
    Step 1) dividing a test area on the liquid crystal panel, which is comprising the RGB test block, the blank block, the monochrome blocks, wherein the monochrome blocks comprise a red test block, a green test block and a blue test block;
    Step 2) detecting the electric resistance and the metal ionic concentration of the RGB test block, the blank block, the monochrome blocks, if the target parameters are in the preset scope, then the detection result shows there is no appearing image sticking on the liquid crystal panel; if the target parameters are exceeding out of the preset scope, then the detection result shows there is appearing image sticking on the liquid crystal panel; and then go on step 3);
    Step 3) detecting the target parameters of the blank block, if the target parameters are exceeding out of the preset scope, then the detection result shows the material of the present liquid crystal base is over proof.

2. The detection method on image sticking of the liquid crystal panel according to claim 1, wherein in step 2), detecting the target parameters of the red test block, the green test block and the blue test block, if the target parameter of any test block is exceeding out of the preset scope, then the detection result shows the image sticking on the liquid crystal panel is exceeding out of the preset scope, and the name of the detected test block is outputted in the detection result.

3. The detection method on image sticking of the liquid crystal panel according to claim 2, wherein in step 4) saving the detected electric resistance and the metal ionic concentration of each test block, so as to trace the effect factors on the image sticking and the quality of the liquid crystal panel.

4. A detection method on image sticking of the liquid crystal panel, which comprising the following steps:
    Step 1) dividing a test area on the liquid crystal panel, which is comprising the RGB test block and the blank block;
    Step 2) detecting the related target parameters of the RGB test block, if the target parameters are in the preset scope, then the detection result shows there is no appealing image sticking on the liquid crystal panel; if the target parameters are exceeding out of the preset scope, then the detection result shows there is appearing image sticking on the liquid crystal panel; and then go on step 3);
    Step 3) detecting the target parameters of the blank block, if the target parameters are exceeding out of the preset scope, then the detection result shows the material of the present liquid crystal base is over proof.

5. The detection method on image sticking of the liquid crystal panel according to claim 4, wherein the target parameters are the electric resistance and the metal ionic concentration of the RGB test block.

6. The detection method on image sticking of the liquid crystal panel according to claim 4, wherein in step 1) the test block is further comprising three monochrome blocks which separately are the red test block, the green test block and the blue test block.

7. The detection method on image sticking of the liquid crystal panel according to claim 5, wherein in step 2), detecting the target parameters of the red test block, the green test block and the blue test block in proper order, if the target parameter of any test block is exceeding out of the preset scope, then the detection result shows the image sticking on the liquid crystal panel is exceeding out of the preset scope, and the name of the detected test block is outputted in the detection result.

8. The detection method on image sticking of the liquid crystal panel according to claim 5, wherein in step 4) saving the detected electric resistance and the metal ionic concentration of each test block, so as to trace the effect factors on the image sticking and the quality of the liquid crystal panel.

\* \* \* \* \*